UNITED STATES PATENT OFFICE.

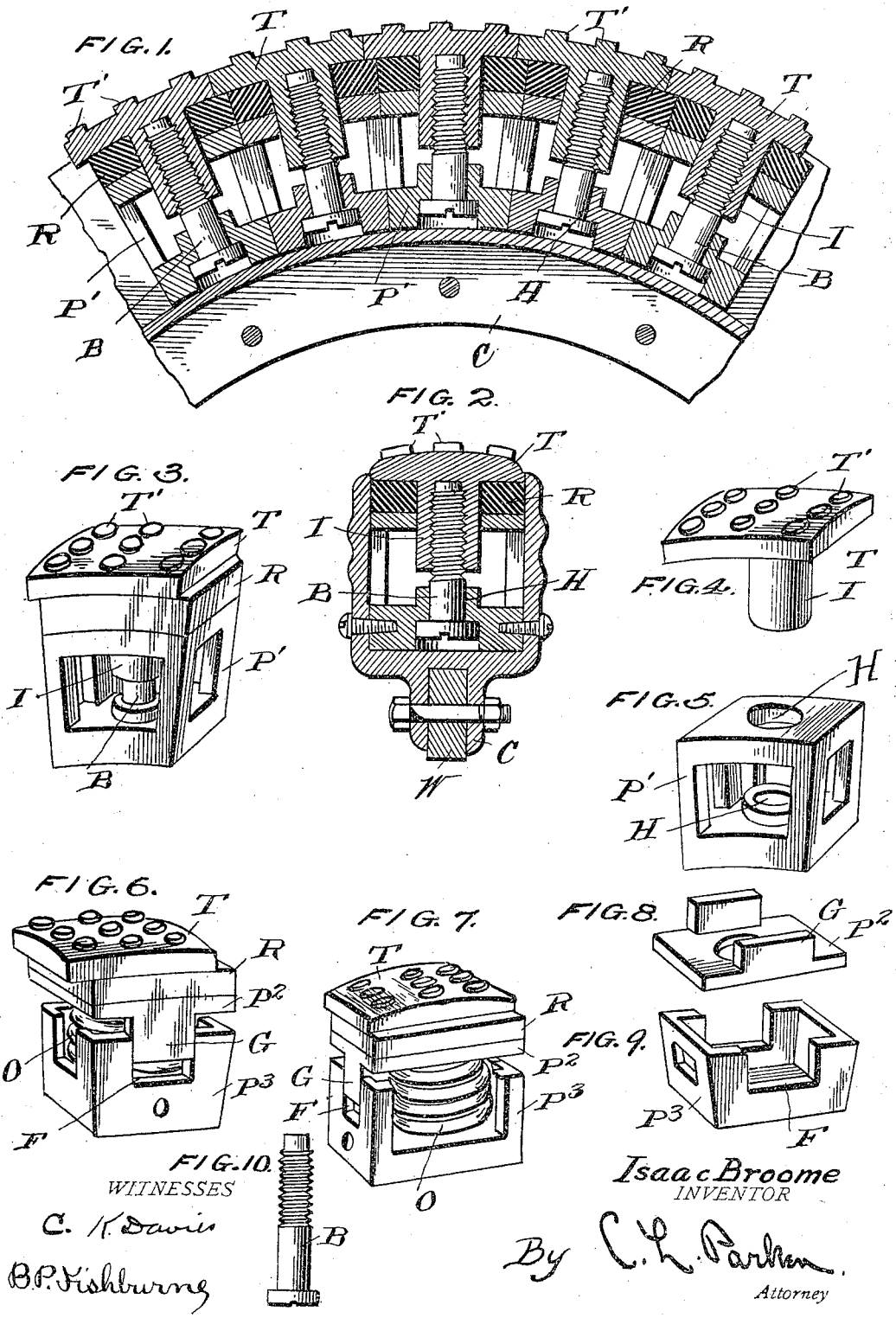

ISAAC BROOME, OF TRENTON, NEW JERSEY.

VEHICLE-RIM.

950,127.  Specification of Letters Patent.  Patented Feb. 22, 1910.

Application filed February 18, 1909. Serial No. 478,590.

*To all whom it may concern:*

Be it known that I, ISAAC BROOME, citizen of the United States, residing at Trenton, in the county of Mercer and State of New Jersey, have invented certain new and useful Improvements in Vehicle-Rims, of which the following is a specification.

My invention relates to an improvement in tires for vehicle wheels, and the object thereof is to provide a reliable and elastic non-puncturable tire, to take the place of the pneumatic tire.

A further object of my invention is the provision of a tire comprising a circular series of radially movable sections, having a novel mounting within a channeled vehicle rim, together with means to elastically support the said sections in their radial movement.

Further objects and advantages of my invention will be apparent to those skilled in the art from the following description, in which reference is made to the accompanying drawing, forming a part of this specification, and in which, Figure 1 is a longitudinal sectional view taken through a portion of a vehicle rim, provided with my improved tire. Fig. 2 is a transverse sectional view therethrough. Fig. 3 is a perspective view of one of my improved tire segments removed. Fig. 4 is a perspective view of the radially movable tread portion of the tire segments shown in Fig. 3, removed. Fig. 5 is a perspective view of the stationary sections of the tire segments shown in Fig. 3, removed. Fig. 6 is a perspective view of a tire segment, of a form slightly modified from that shown in Figs. 2 to 5 inclusive. Fig. 7 is a similar view to that shown in Fig. 6. Fig. 8 is a perspective view of the upper portion of the stationary member of the tire segments shown in Figs. 6 and 7, which upper portion is, in this form, movable. Fig. 9 is a similar view of the lower stationary half of the stationary member of one of the tire segments, and, Fig. 10 is an elevation of the bolt connecting the movable and stationary members of each of the tire segments.

In the accompanying drawings, C represents the channeled rim of a wheel W, the character of rim shown, being most suitable for the reception of the elements which go to make up my improved tire. In the practical embodiment of my invention, I provide the channeled wheel rim C with a plurality of tire segments, arranged in a circular series therein, and embodying radially movable elastically supported sections, which form the tread for the wheel. The stationary portions of the wheel segments shown in Figs. 2 to 5 inclusive, are in the form of blocks P', which are hollow, and may be provided with apertured walls, as shown, for the sake of lightness. The members P' are provided with slightly tapering sides, and with openings H centrally through their upper and lower walls, the opening H in the lower wall terminating in an enlarged cut out portion at its outer end, for a purpose to be hereinafter described. The movable sections of the tire segments shown in this form of my invention, are in the form of plates T, which have their upper outer surfaces curved as shown, and provided with tread projections T' if so desired. The plates T are provided with downwardly extending tubular portions I, projecting therefrom at one side of the center thereof, and internally threaded for the reception of the threaded end of a bolt B, the shank of which projects upwardly through the lower opening H of the stationary member P', with its head resting within enlarged cut out portion previously mentioned, and as shown clearly in Fig. 2. This engagement takes place when the tubular member I has been inserted downwardly through the upper opening H of stationary member P', and is so arranged that plates T may be moved toward and away from the member P'.

Disposed between the continuous surfaces of plates T and the member P' is a layer of rubber or similar elastic material R, which surrounds the tubular member I and serves, in the form described, as the sole support of an elastic nature for the tread plates T, which is shown in Fig. 1 by reason of the fact that tubular portion I projects therefrom from one side of their centers, slightly overlap the joint of the rubber strip R in the assembled relation of the tire segments.

In the forms shown in Figs. 6 to 9 inclusive, the stationary members P' are formed in upper and lower portions $P^2$ and $P^3$ respectively, as will be seen by reference to Figs. 8 and 9, said upper and lower sections being provided with relatively interfitting projections G and cut out portions F, and the upper section $P^2$ thus forming a bearing against which an elastic coil spring O extends, which spring is mounted about the tubular portion I of plate T, and about bolt B as shown, to form a support for the tread plate T in addition to the rubber strip R, which may also be used with this form of my invention.

Having fully described my invention, I claim:

1. In a device of the character described, the combination with a channeled rim, of a tire, said tire comprising a plurality of skeleton blocks, means for rigidly securing said blocks within said rim, a plurality of sections forming the tread portion of said tire, each of said sections having an extension radially movably mounted within each of said blocks, a section of elastic material arranged between each of the tread sections and each of said blocks, said tread section extending beyond said elastic section at one end and terminating at a point inwardly of the same at the other end, and means engaging said extension and associated with said block for limiting the movement of the former.

2. In a device of the character described, the combination with a channeled rim, of a tire, said tire comprising a plurality of blocks, means for securing said blocks within said rim, a plurality of sections forming the tread portion of said tire, said sections having depending extensions radially movably mounted within said blocks, an elastic medium arranged between said sections and said blocks, said tread sections extending beyond said blocks at one end and terminating at a point inwardly of the same at the other end, and members secured to said depending extensions and radially movably mounted within the inner portions of said blocks for limiting the movement of said tread sections.

In testimony whereof I affix my signature in presence of two witnesses.

ISAAC BROOME.

Witnesses:
 ROBERT R. VOLK,
 H. F. HARRIS.